(12) United States Patent
Guim Bernat et al.

(10) Patent No.: US 11,126,568 B2
(45) Date of Patent: Sep. 21, 2021

(54) OBJECT COHERENCE IN DISTRIBUTED SHARED MEMORY SYSTEMS

(71) Applicant: INTEL CORPORATION, Santa Clara, CA (US)

(72) Inventors: Francesc Guim Bernat, Barcelona (ES); Kshitij A. Doshi, Tempe, AZ (US); Robert G. Blankenship, Tacoma, WA (US); Raj K. Ramanujan, Federal Way, WA (US)

(73) Assignee: INTEL CORPORATION, Santa Clara, CA (US)

( * ) Notice: Subject to any disclaimer, the term of this patent is extended or adjusted under 35 U.S.C. 154(b) by 243 days.

(21) Appl. No.: 16/328,044

(22) PCT Filed: Sep. 30, 2016

(86) PCT No.: PCT/US2016/054602
§ 371 (c)(1),
(2) Date: Feb. 25, 2019

(87) PCT Pub. No.: WO2018/063266
PCT Pub. Date: Apr. 5, 2018

(65) Prior Publication Data
US 2019/0220420 A1 Jul. 18, 2019

(51) Int. Cl.
*G06F 12/14* (2006.01)
*G06F 12/0813* (2016.01)
*G06F 9/50* (2006.01)
*G06F 12/0831* (2016.01)
*G06F 12/0817* (2016.01)
(Continued)

(52) U.S. Cl.
CPC ............ *G06F 12/1425* (2013.01); *G06F 9/50* (2013.01); *G06F 9/5016* (2013.01); *G06F 12/0808* (2013.01); *G06F 12/0813* (2013.01); *G06F 12/0815* (2013.01); *G06F 12/0826* (2013.01); *G06F 12/0831* (2013.01);
(Continued)

(58) Field of Classification Search
CPC ...... G06F 9/50; G06F 9/5016; G06F 12/0808; G06F 12/0813; G06F 12/0815; G06F 12/0826; G06F 12/0831; G06F 12/1425; G06F 12/1441; G06F 2212/1016; G06F 2212/154
USPC .......................................... 711/145, 148, 152
See application file for complete search history.

(56) References Cited

U.S. PATENT DOCUMENTS

| 5,752,258 A | 5/1998 | Guzovskiy et al. |
| 5,918,248 A | 6/1999 | Newell et al. |

(Continued)

FOREIGN PATENT DOCUMENTS

EP 0844559 A2 5/1998

OTHER PUBLICATIONS

International Search Report dated May 24, 2017 for International Patent Application No. PCT/US2016/054602, 3 pages.

*Primary Examiner* — Gary J Portka
(74) *Attorney, Agent, or Firm* — Kacvinsky Daisak Bluni PLLC

(57) ABSTRACT

Examples may include techniques to enable cache coherency of objects in a distributed shared memory (DSM) system, even where multiple nodes in the system manage the objects. Node memory space includes a tracking address space (TAS) where lines in the TAS correspond to objects in the (DSM). Access to the objects and the TAS is managed by a host fabric interface (HFI) caching agent in HFI of a node.

25 Claims, 10 Drawing Sheets

(51) Int. Cl.
*G06F 12/0808* (2016.01)
*G06F 12/0815* (2016.01)

(52) U.S. Cl.
CPC .. *G06F 12/1441* (2013.01); *G06F 2212/1016* (2013.01); *G06F 2212/154* (2013.01)

(56) References Cited

U.S. PATENT DOCUMENTS

| | | | |
|---|---|---|---|
| 8,732,386 B2 * | 5/2014 | O'Krafka | G06F 12/0284 711/103 |
| 2003/0041225 A1 | 2/2003 | Mattina et al. | |
| 2005/0283645 A1 * | 12/2005 | Turner | H04L 69/40 714/4.11 |
| 2015/0331798 A1 | 11/2015 | Guthrie et al. | |
| 2020/0042444 A1 * | 2/2020 | Kang | H04L 67/1097 |

* cited by examiner

OBJECT COHERENCE IN DISTRIBUTED SHARED MEMORY SYSTEMS

CROSS-REFERENCE TO RELATED APPLICATIONS

This application is a national phase claiming the benefit of and priority to International Patent Application No. PCT/US2016/054602, entitled "OBJECT COHERENCE IN DISTRIBUTED SHARED MEMORY SYSTEMS," filed Sep. 30, 2016, which is hereby incorporated by reference in its entirety.

TECHNICAL FIELD

Examples described herein are generally related to configurable computing resources and particularly to shared memory systems.

BACKGROUND

Multiple computing resources are often grouped into large sets of computing resources to accomplish various computing tasks. These resources can be distributed across a number of physical computing resources, such as, servers. With some distributed computing resources, memory is distributed across the system. Such systems are sometimes referred to as distributed shared memory (DSM) systems. In general, a DSM system spreads program address spaces over a number of physical computing resources, such as, servers. Accordingly, the scope and size of computing tasks, and particularly, the memory allocated to these tasks, can be changed dynamically.

DETAILED DESCRIPTION

Figure 1:
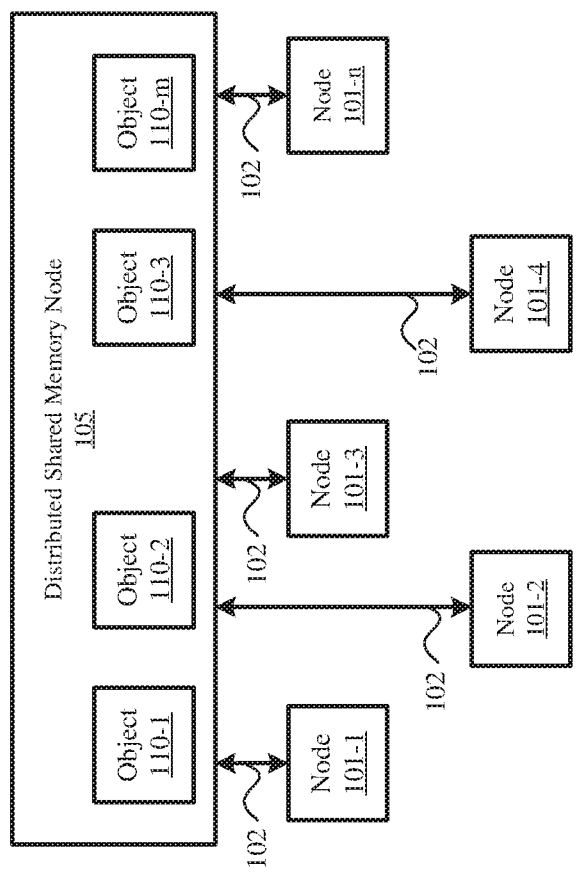
FIG. 1 illustrates an example first system.

In general, the present disclosure provides object-granular coherency for nodes within a DSM system. More specifically, the present disclosure can be implemented to provide mechanisms for multiple threads to cooperate to access an object (or objects) in a DSM system. In general, a DSM system can provide storage (e.g., physical computer-readable media storage, or the like) accessible to nodes of the system. In particular, the nodes can access the DSM (and objects stored on the DSM) over a network fabric. A variety of modern databases, application servers, or real-time decision support systems may rely on DSMs to change the scope, size, and speed of their operations dynamically. Thus, each of the nodes can access the DSM through a host fabric interface (HFI) to execute various tasks (e.g., computing threads, or the like) involving objects stored on the DSM. The HFIs maintain a tracking address space (TAS) including indications of locations and ownership of the objects stored within the DSM. Applications executing on the nodes can cooperate to access the objects through a cache agent of the HFIs. The cache agents can maintain the TSA and ownership information indicated within the TSA. Although this is described in greater detail below, a more through explanation is given at this point.

In general, threads executing on processing elements (e.g., central processing units (CPUs), cores of CPUs, or the like) of nodes can request ownership to objects and also determine ownership (e.g., read/write access permissions, or the like) of objects to cooperate to access such object in the DSM system. It is important to note; the threads can be threads from a single application or threads from multiple applications. Furthermore, the threads can be executed on the same node in a system or on different nodes in the system. The threads may send control signals or information elements to the HFI of the node. The node may grant permission to access the objects based on the TSA or may coordinate access with another HFI within the system (e.g., in the case of multi-node systems). As such, nodes can extend cache coherence over the virtual domain of the DSM. More specifically, HFIs within the nodes manage a TSA to coordinate cache coherence for objects within the DSM.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 illustrates an example system 100, in which nodes 101-1, 101-2, 101-3, 101-4 to 101-n can access a distributed shared memory (DSM) node 105. It is noted, that although the DSM is indicated and described herein as a "node" it can be spread across many nodes of the system 100. Said differently, the DSM 105 can be implemented to spread an address space over clusters of servers.

Furthermore, it is noted, that the nodes 101-1 to 101-n as well as the DSM node 105, can be implemented upon, or organized from, a pool of disaggregate physical elements, such as, for example, servers in a datacentre, or the like. Examples are not limited in these contexts.

The nodes 101-1 to 101-n and the DSM node 105 are coupled via a fabric 102, sometimes referred to as a network. In general, the DSM node 105 is a collection of physical computer-readable storage locations (e.g., servers, or the like) in which objects 110-1, 110-2, 110-3 to 110-m can be stored. It is noted, that the objects 110-1 to 110-m can be any of a variety of elements to be stored within a DSM. However, for purposes of example and discussion only, the objects 110-1 to 110-m can be information elements, data structures, databases, applications, virtual machines, containers, data stores, software constructs, or the like. Examples are not limited in this context.

It is to be appreciated, the DSM node 105 can be implemented as a number of physically separate memory stores (e.g., servers, or the like) addressed as a single memory store. More specifically, the memory within the DSM node 105 can be addressed as a single address space.

Furthermore, nodes 101-1 to 101-*n* may each attempt to access object(s) 110-1 to 110-*m* stored within DSM. For example, multiple threads executing on a single node (e.g., refer to FIGS. 4-6 and 9) can coordinate to access the same object. As another example, threads executing on multiple nodes (e.g., refer to FIGS. 7-8) can coordinate to access the same object. The present disclosure provides nodes 101-1 to 101-*n* to cooperate and coordinate the accessing and/or caching of the objects 110-1 to 110-*m*. Thus, the nodes 101-1 to 101-*n* are configured to have object-granular coherency for the objects 110-1 to 110-*m* in the DSM node 105. In general, each of the nodes 101-1 to 101-*n* couple to the fabric 102 via a HFI. The HFIs manage a TSA (refer to FIG. 3) within node memory space (refer to FIG. 2) to coordinate access and coherency of the objects 110-1 to 110-*m*.

Figure 2:
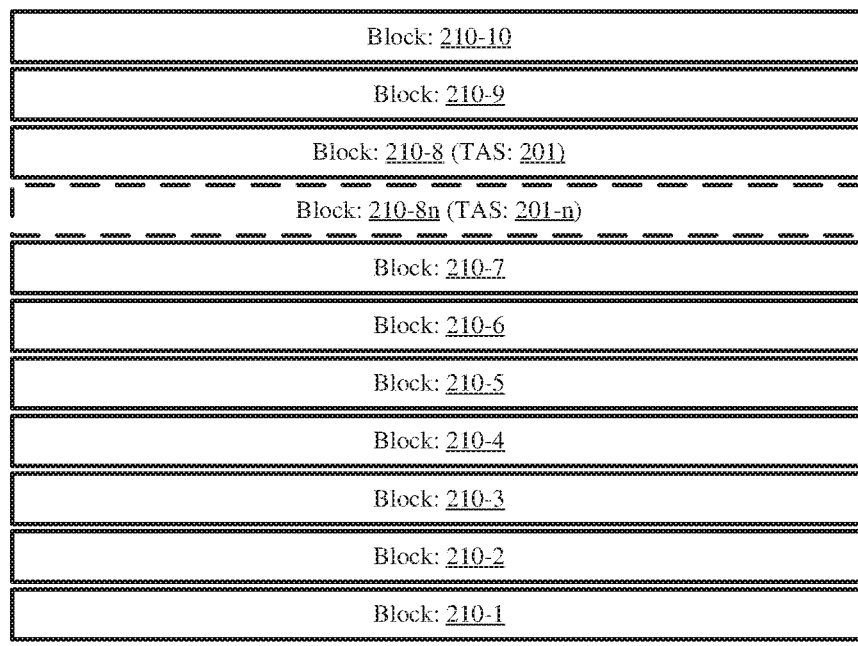
FIG. 2 illustrates an example memory map.

Turning more specifically to FIG. 2, a block diagram of an example node memory map 200, also referred to as "memory space" or "address space" is provided. In general, the memory map 200 can correspond to the local node memory. For example, node 101-1 to 101-*m* can have an amount of local memory (e.g., RAM, or the like) segregated into blocks 210. One of the blocks corresponds to a TAS 201. For example, blocks 210-1, 210-2, 210-3, 210-4, 210-5, 210-6, 210-7, 210-8, 210-9 and 210-10 are represented. It is noted, that in many typical implementations, memory map 200 may include more than the ten (10) blocks depicted. However, for purposes of clarity of presentation, only these ten blocks are depicted. Each of the blocks 210-1 to 210-10 can correspond to a region of addressable memory within the node (e.g. one of nodes 101-1 to 101-*n*). For example, blocks 210-1 to 210-10 can correspond to VGA hole memory locations, PAM hole memory locations, ISA hole memory locations, low DRAM (e.g., <2 MB, or the like) memory locations, TSeg memory locations, MeSeg memory locations, PCIe configuration memory locations, MMIO memory locations, high DRAM (e.g., >2 MB, or the like).

Additionally, as noted, at least one of blocks 210 corresponds to a TAS 201. For example, block 210-8 is depicted corresponding to TAS 201. In general, TAS 201 (and thus block 210-8) includes a number of cache lines (e.g., refer to FIG. 3), each of which represents one of objects 110-1 to 110-*m*.

Conventional computing systems provide access and coherency to the memory blocks 210 via a memory agent (or host agent), such as, for example, a memory access chipset (e.g., North Bridge, South Bridge, or the like). The present disclosure provides a TAS caching agent for each node (e.g., refer to FIGS. 4 and 7) to access and control the TAS 201. As such, the host agent does not control or manage the TAS 201.

Furthermore, in some implementations (e.g. multi-node coherency implementations, or the like) multiple blocks 210 can represent a TAS 201. For example, a block 210 could be set aside and correspond to a TAS 201 for each node in the system 100. As depicted, the memory map 200 can include another block 210-8*n* corresponding to TAS 201-n. As such, TAS 201 could correspond to a first node (e.g., local node, node 101-1, or the like) while TAS 201-*n* could correspond to a second node (e.g., node 101-*n*, or the like).

Figure 3:
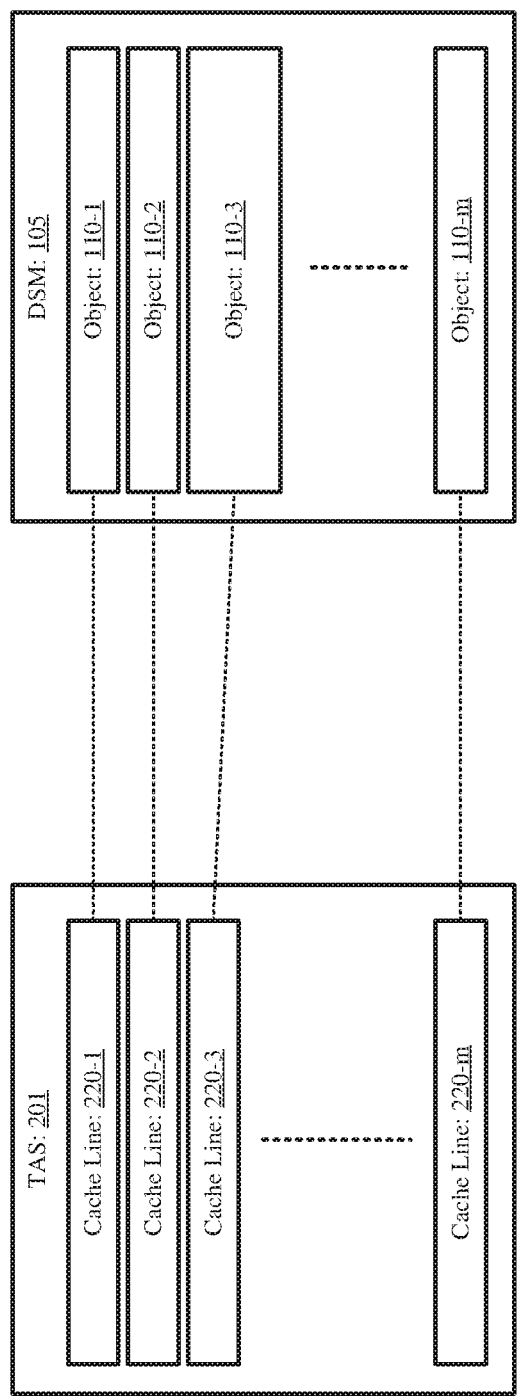
FIG. 3 illustrates an example tracking address space.

Turning more specifically to FIG. 3, a block diagram of an example TAS 201 is depicted. As stated, the TAS 201 is a block of local memory within each node (e.g., nodes 101-1 to 101-*n*), where each line (or entry) within the TAS 201 corresponds to an object 110-1 to 110-*m* in the DSM node 105. More specifically, the TAS 201 includes cache lines 220-1 to 220-*m*. Each of the cache lines 220-1 to 220-*m* correspond to objects 110-1 to 110-*m*. For example, cache lines 220-1, 220-2, 220-3 to 220-*m* are depicted. In some examples, each cache line 220-1 to 220-*m* can include an indication of a location of the corresponding object 110-1 to 110-*m* within the DSM node 105 as well as an indication of an ownership (e.g., current thread with access to the object). In some examples, each cache line 220-1 to 220-*m* can have a limit of 64 bytes.

Furthermore, it is worthy to note, that cache lines 220-1 to 220-*m* can represent objects of varying size. For example, cache line 220-1 can correspond to object 110-1, cache line 220-2 can correspond to object 110-2, cache line 220-3 can correspond to object 110-3, and cache line 220-*m* can correspond to object 110-*m*. In practice, any of objects 110-1 to 110-*m* can have different sizes (e.g., in bytes, or the like). For example, object 110-3 is depicted as having a different size than the other blocks. However, the present disclosure provides that cache lines within a TAS (e.g., cache lines 220-1 to 220-*m*) may remain the same regardless of the size of the object.

Figure 4:
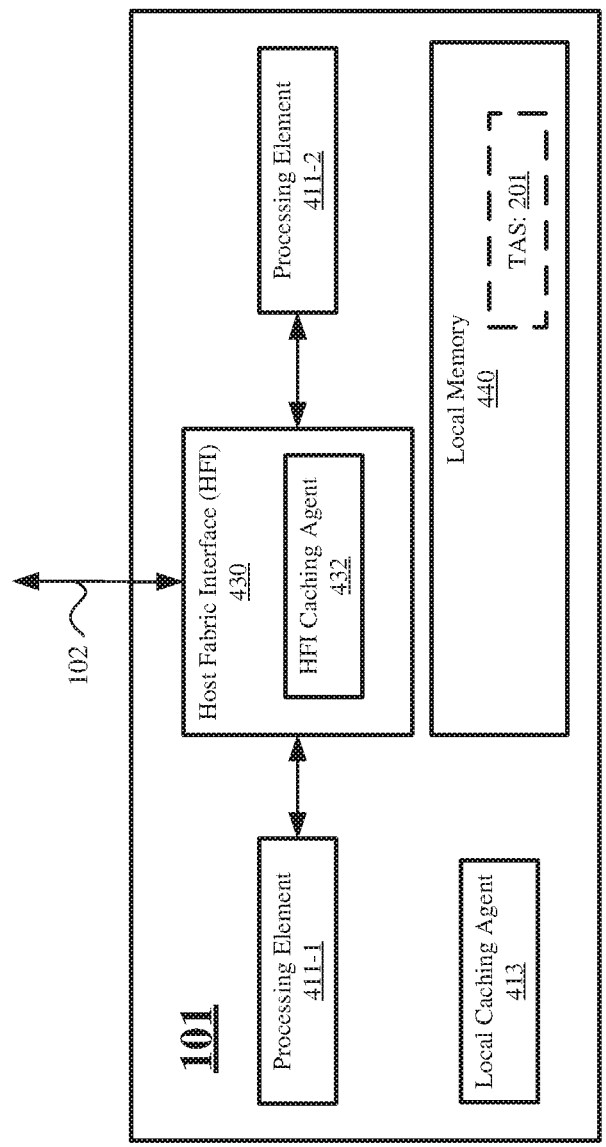
FIG. 4 illustrates a first example node of the system of FIG. 1.

FIG. 4 illustrates an example node 101. The node 101 depicted here can correspond to any one of the nodes 101-1 to 101-*n* of the system 100 of FIG. 1. Examples are not limited in this context. The node 101 includes a number of processing elements 411 and local memory 440. In this example, the node 101 is depicted including processing elements 411-1 and 411-2. It is noted, that the node 101 could include more or less processing elements than depicted. In some examples, the processing elements can be CPUs, CPU cores, or the like while the local memory can be RAM.

Furthermore, the node 101 includes a HFI 430 to couple the node 101 to the fabric 102. The HFI includes a HFI caching agent 432 to manage the TAS 201 while the node 101 includes a local caching agent 413 to manage the coherency in the balance of local memory 440.

In general, the HFI caching agent 432 implements cache coherency for the TAS 201 based on any of a variety of coherency protocols, such as, for example, the MESI protocol, the MOESI protocol, or the like. Furthermore (as described in greater detail with respect to FIGS. 7-8) HFI caching agent 432 can act as a remote agent for the HFIs in other nodes of the system 100. It is noted, access to the TAS 201 does not generate actual data movement, but merely generates cache coherence signaling between processing elements 411-1, 411-2 and the HFI 430.

Figure 5:
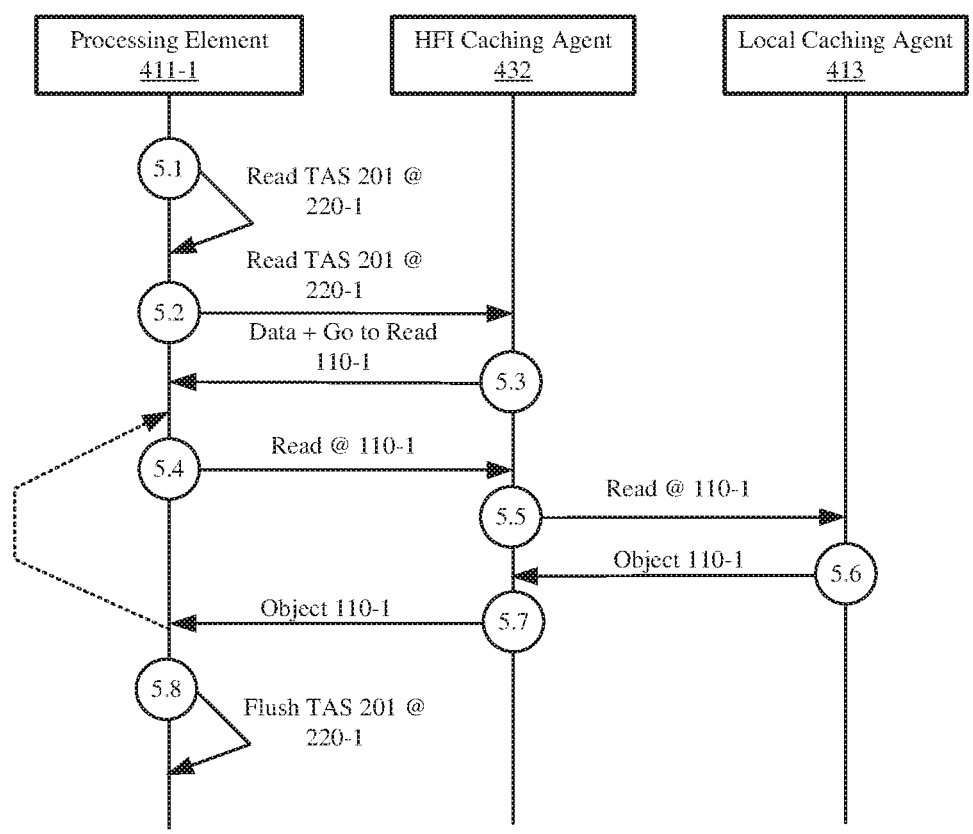
FIG. 5 illustrates a first example technique.
Figure 6:
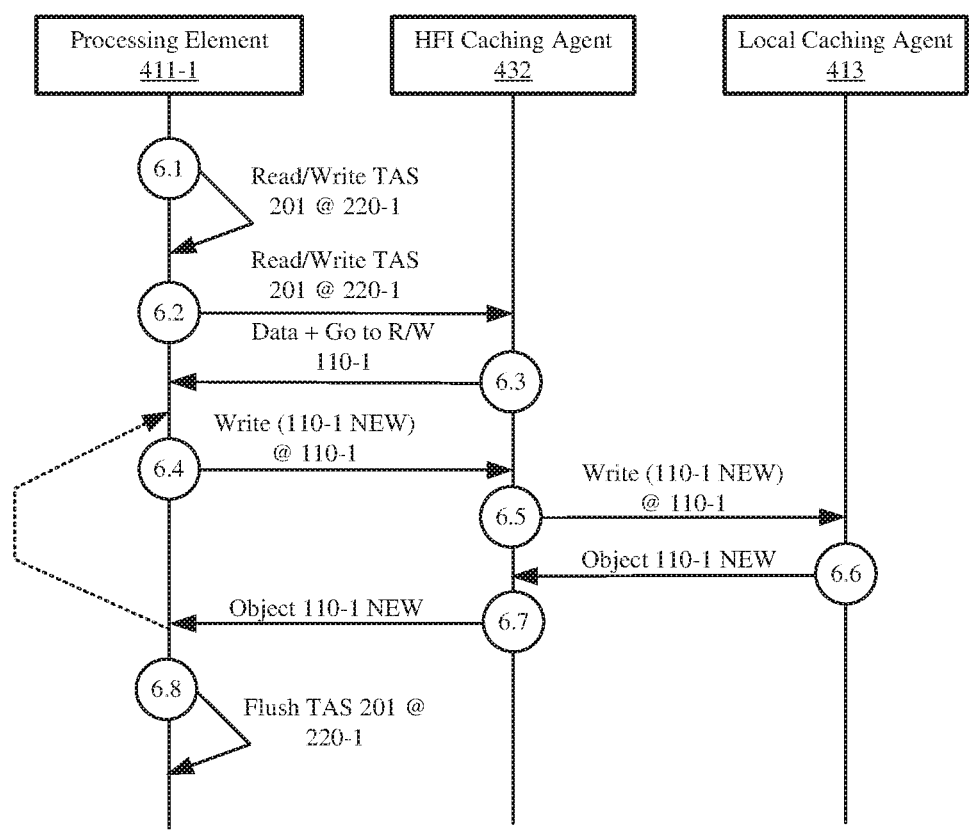
FIG. 6 illustrates a second example technique.
Figure 9:
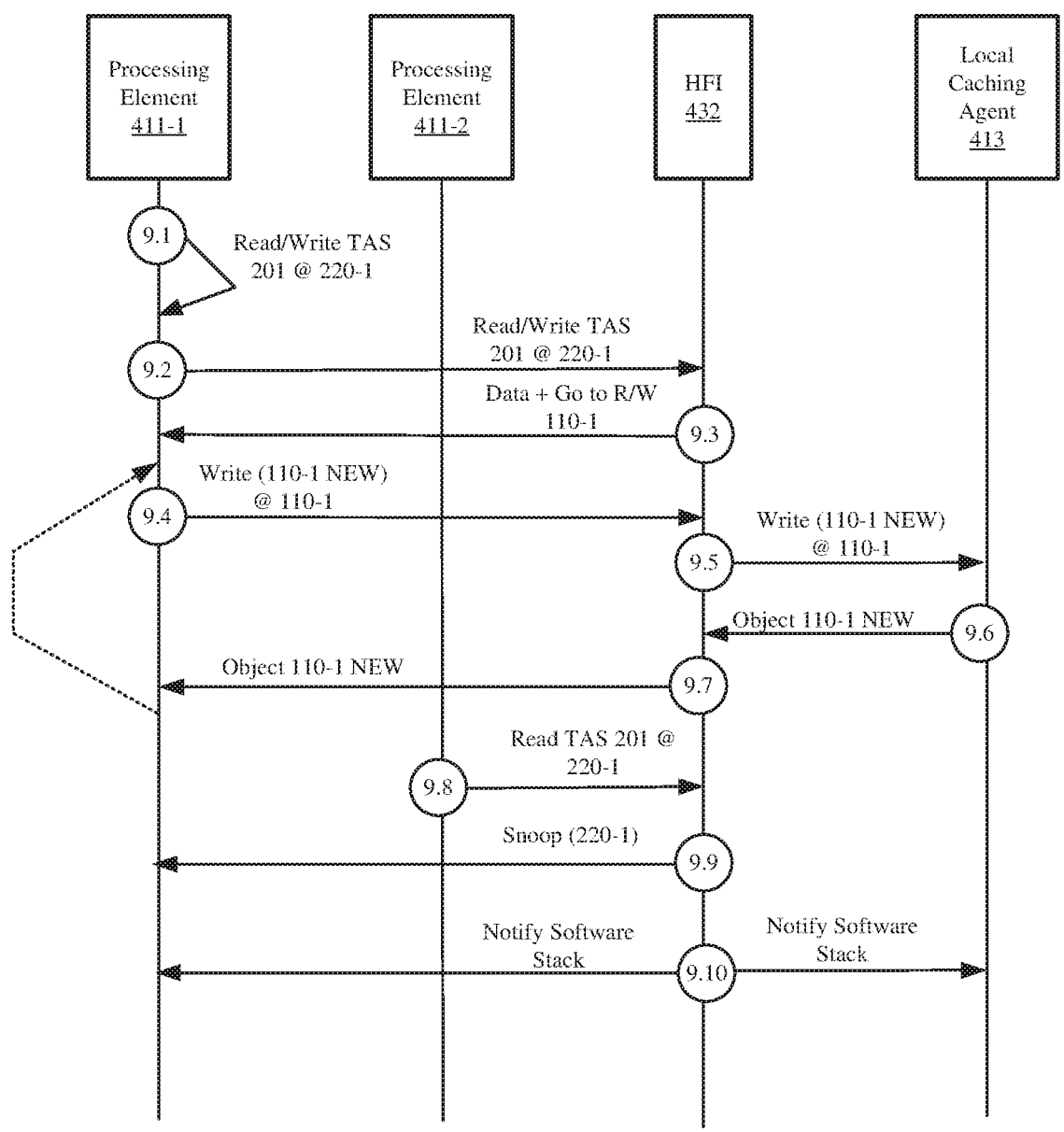
FIG. 9 illustrates a fourth example technique.

FIGS. 5-6 depict techniques to access objects 110-1 110-*m* in the DSM node 105. In particular, FIG. 5 depicts technique 500 in which processing element 411-1 accesses object 110-1 for read-only purposes while FIG. 6 depicts technique 600 in which processing element 411-1 accesses object 110-1 exclusively, or for read/write purposes. These techniques are described with reference to the node 101 depicted in FIG. 4. However, it is noted, the techniques could be implemented to access objects in any DSM system, and particularly, to provide cache-coherence at the object level in a DSM system. Furthermore, it is worthy to note, that techniques 500 and 600 are described in the context of not having a conflict between ownership requests. However, FIG. 9 depicts a technique including an example conflict between ownership requests.

Turning more specifically to FIG. 5 and the technique 500. The techniques 500 can begin at circle 5.1. At circle 5.1, processing element 411-1 issues a read request for object 110-1 (e.g., Read TAS 201 @220-1). More specifically, an element (e.g., thread, application, or the like) executing on processing element 411-1 issues a read request for the object in cache line 220-1 of TAS 201 (e.g., object 110-1).

Continuing to circle 5.2, the processing element 411-1 issues the read request (e.g., Read TAS 201 @220-1) to the HFI 430, and particularly to the HFI caching agent 432.

Continuing to circle 5.3, the HFI caching agent 432 accesses the TAS 201, determines whether object 110-1 is available to access as requested and sends a control signal including an indication to access object 110-1. In some examples, HFI caching agent 432 can also return "fake data," similar to how caching agents (e.g., local agent, home agent, or the like) in memory controllers do. In some examples, the HFI caching agent 432 can issue an interrupt (e.g., to the application stack executing on the processing element, or the like) if the command received at circle 5.2 is not supported.

In some examples, the processing element 411-1, and particularly, the thread executing on the processing element 411-1 can stall until a response (e.g., at circle 5.3, or the like) is received from the HFI caching agent 432 to ensure coherency for the object 110-1.

Continuing to circles 5.4, 5.5, 5.6 and 5.7, processing element 411-1 can issue read memory requests for object 110-1 and receive data or information elements including the object 110-1. At circle 5.4, processing element 411-1 (or thread executing on processing element 411-1) issues a read request for object 110-1 to HFI caching agent 432. At circle 5.5, HFI caching agent 432 relays the read request to local caching agent 413. At circle 5.6, local caching agent 413 retrieves the object 110-1 from the DSM node 105 (e.g., over fabric 102, or the like) and sends the object to the HFI caching agent 432. At circle 5.7, the HFI caching agent 432 relays the object 110-1 to the processing element 411-1.

It is noted, that circles 5.4, 5.5, 5.6 and 5.7 can be repeated a number of times. For example, processing element 411-1 can issue any number of read requests to the object 110-1.

Continuing to block 5.8, upon completion of accessing object 110-1, processing element 411-1 can flush object 110-1 from its cache(s). For example, processing element 411-1 can issue a CLFLUSHOPT command to flush object 110-1 from its cache. Furthermore, processing element 411-1 can invalidate cache line 220-1 of TAS 201 from its cache. Upon such invalidation, any acquired lock to the cache line can be released by the HFI caching agent 432 (e.g., in an implicit manner, or the like).

In some examples, processing element 411-1 can lock capacity evictions of cache lines 220. More particularly, when one of the cache lines 220 tracked by the HFI caching agent 432 is evicted from a given core (e.g., cache line 220-1 at circle 5.8) the HFI caching agent 432 can notify the processing elements (e.g., 411-1) (e.g., passively, actively, or the like) of the eviction. The processing element 411-1 could confirm that it actually released the object and that the eviction is not due to capacity.

In some examples, cache lines 220 can be marked as "pinned" or more generally, software managed. As such, the processing elements, and particularly the cache agents may not evict cache lines without receiving explicit commands Turning more specifically to FIG. 6 and the technique 600. The techniques 600 can begin at circle 6.1. At circle 6.1, processing element 411-1 issues a read/write request for object 110-1 (e.g., Read/Write TAS 201 @220-1). More specifically, an element (e.g., thread, application, or the like) executing on processing element 411-1 issues a read/write request for the object in cache line 220-1 of TAS 201 (e.g., object 110-1).

Continuing to circle 6.2, the processing element 411-1 issues the read/write request (e.g., m Read/Write TAS 201 @220-1) to the HFI 430, and particularly to the HFI caching agent 432.

Continuing to circle 6.3, the HFI caching agent 432 accesses the TAS 201, determines whether object 110-1 is available to access as requested and sends a control signal including an indication to access object 110-1. In some examples, HFI caching agent 432 can also return "fake data," similar to how caching agents (e.g., local agent, home agent, or the like) in memory controllers do. In some examples, the HFI caching agent 432 can issue an interrupt (e.g., to the application stack executing on the processing element, or the like) if the command received at circle 6.2 is not supported.

In some examples, the processing element 411-1, and particularly, the thread executing on the processing element 411-1 can stall until a response (e.g., at circle 6.3, or the like) is received from the HFI caching agent 432 to ensure coherency for the object 110-1.

Continuing to circles 6.4, 6.5, 6.6 and 6.7, processing element 411-1 can issue read or write memory requests for object 110-1 and receive data or information elements including the object 110-1 and or indications of confirmation of write. It is noted, an example write request is depicted in this figure. However, read requests (e.g., refer to FIG. 5) could also be issued. At circle 6.4, processing element 411-1 (or thread executing on processing element 411-1) issues a write request for object 110-1 to HFI caching agent 432. In particular, processing element 411-1 can issue a command to write over or change a portion of object 110-1 (e.g., with object 110-1 NEW, or the like). At circle 6.5, HFI caching agent 432 relays the write request to local caching agent 413. At circle 6.6, local caching agent 413 writes object 110-1 NEW to the DSM node 105 (e.g., over fabric 102, or the like) and sends an indication of confirmation of the write, or the newly written object 110-1 (e.g., object 110-1 NEW) to the HFI caching agent 432. At circle 6.7, the HFI caching agent 432 relays the indication of write conformation or the object 110-1 NEW to the processing element 411-1.

It is noted, that circles 6.4, 6.5, 6.6 and 6.7 can be repeated a number of times. For example, processing element 411-1 can issue any number of read and/or write requests to the object 110-1.

Continuing to block 6.8, upon completion of accessing object 110-1, processing element 411-1 can flush object 110-1 from its cache(s). For example, processing element 411-1 can issue a command to flush object 110-1 from its cache. Furthermore, processing element 411-1 can invalidate cache line 220-1 of TAS 201 from its cache. Upon such invalidation, any acquired lock to the cache line can be released by the HFI caching agent 432 (e.g., in an implicit manner, or the like).

In some examples, processing element 411-1 can lock capacity evictions of cache lines 220. More particularly, when one of the cache lines 220 tracked by the HFI caching agent 432 is evicted from a given core (e.g., cache line 220-1 at circle 6.8) the HFI caching agent 432 can notify the processing elements (e.g., 411-1) (e.g., passively, actively, or the like) of the eviction. The processing element 411-1 could confirm that it actually released the object and that the eviction is not due to capacity.

In some examples, cache lines 220 can be marked as "pinned" or more generally, software managed. As such, the processing elements, and particularly, the cache agents may not evict cache lines without receiving explicit commands.

Some modern DSM systems expose memories between different nodes within the same cluster through a fabric. For example, with respect to the DSM system 100 of FIG. 1, portions of DSM node 105 memory could be partitioned and assigned to each of the nodes 101-1 to 101-*n*. As such, the HFI of each node 101-1 to 101-*n* could act as a "home agent" for managing consistency of a set of objects on DSM node 105. For example, node 101-1 could manage object 110-1 and 110-2 while node 101-2 could manage objects 110-3 to 110-*m*.

Figure 7:
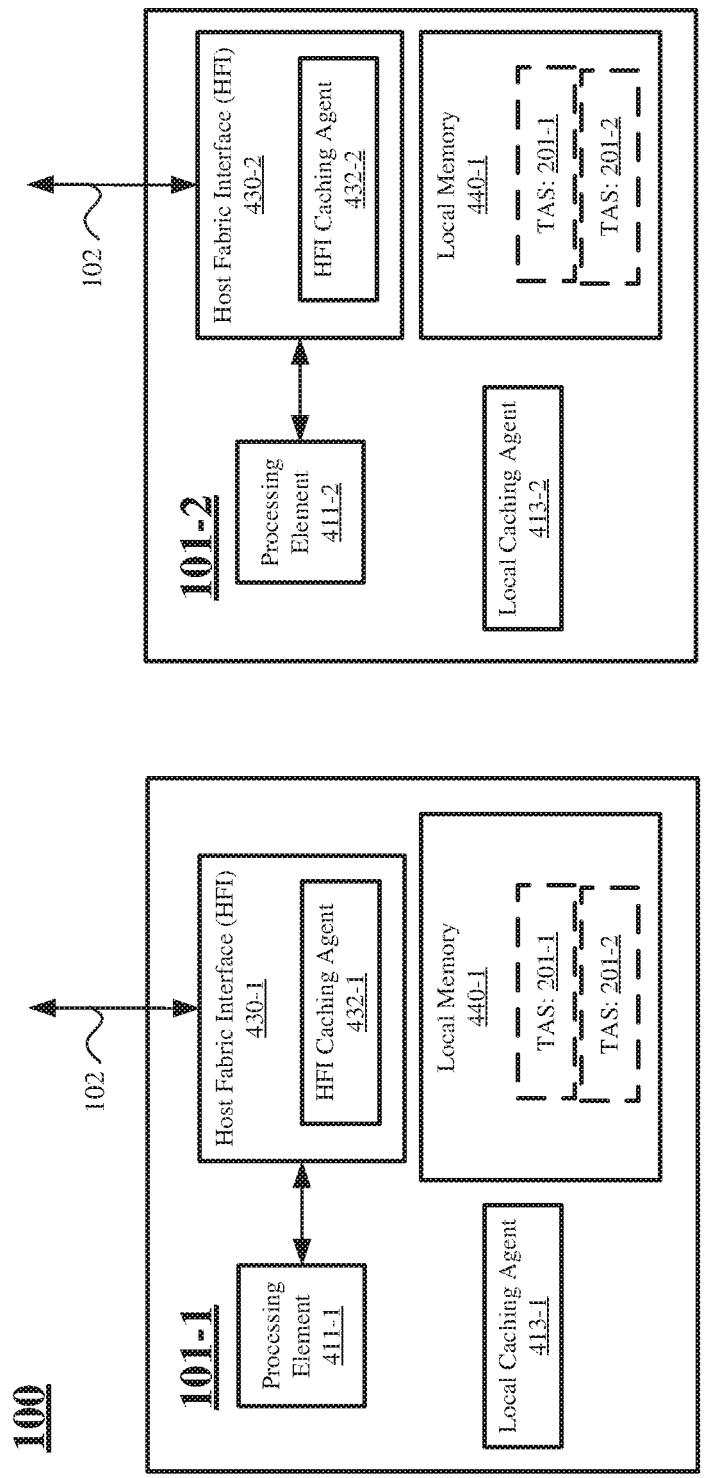
FIG. 7 illustrates example nodes the system of FIG. 1.

FIG. 7 illustrates an example of the system 100 where multiple nodes manage objects in the DSM. Turning more particularly to this figure, nodes 101-1 and 101-2 are depicted. Each of the nodes 101-1 and 101-2 include a processing elements 411 and local memory 440. In particular, node 101-1 includes processing element 411-1 and local memory 440-1 while node 101-2 includes processing element 411-2 and local memory 440-2. It is noted, that the nodes 101-1 and 101-2 could include more or less processing elements than depicted. In some examples, the processing elements can be CPUs, CPU cores, or the like while the local memory can be RAM.

Furthermore, the nodes 101-1 and 101-2 include HFIs 430-1 and 430-2, respectively, to couple the nodes to the fabric 102. The HFIs 430-1 and 430-2 includes HFI caching agents 432-1 and 432-2, respectively. HFI caching agents 432-1 and 432-2 manage the TAS corresponding to the portion of DSM node 105 memory assigned to each node 101-1 or 101-2. This is described in greater detail below. Additionally, nodes 101-1 and 101-2 include local caching agents 413-1 and 413-2, respectively, to manage the coherency in the balance of local memory 440-1 or 440-2.

As noted above, some examples may partition memory in the DSM node 105 (or objects stored in DSM node 105) among nodes 101. For example, assume node 101-1 managed object 110-1 while node 101-2 managed object 110-2. Each node would then include a TAS 201 (e.g., TAS 201-1 and TAS 201-2, respectively) to manage access to the objects and cache-coherency for the objects as described herein. The HFI caching agents 432-1 and 432-2 can implement cache coherency for the TAS 201-1 and 201-2 based on any of a variety of coherency protocols, such as, for example, the MESI protocol, the MOESI protocol, or the like.

However, when a read or read/write request is received by an HFI caching agent 432, the HFI caching agent whether the object of interest is managed by itself or another HFI caching agent (e.g., based on TAS 201-1 and TAS 201-2. The request can be relayed through the appropriate HFI caching agent if needed. An example technique describing this process is depicted in FIG. 8.

Figure 8:
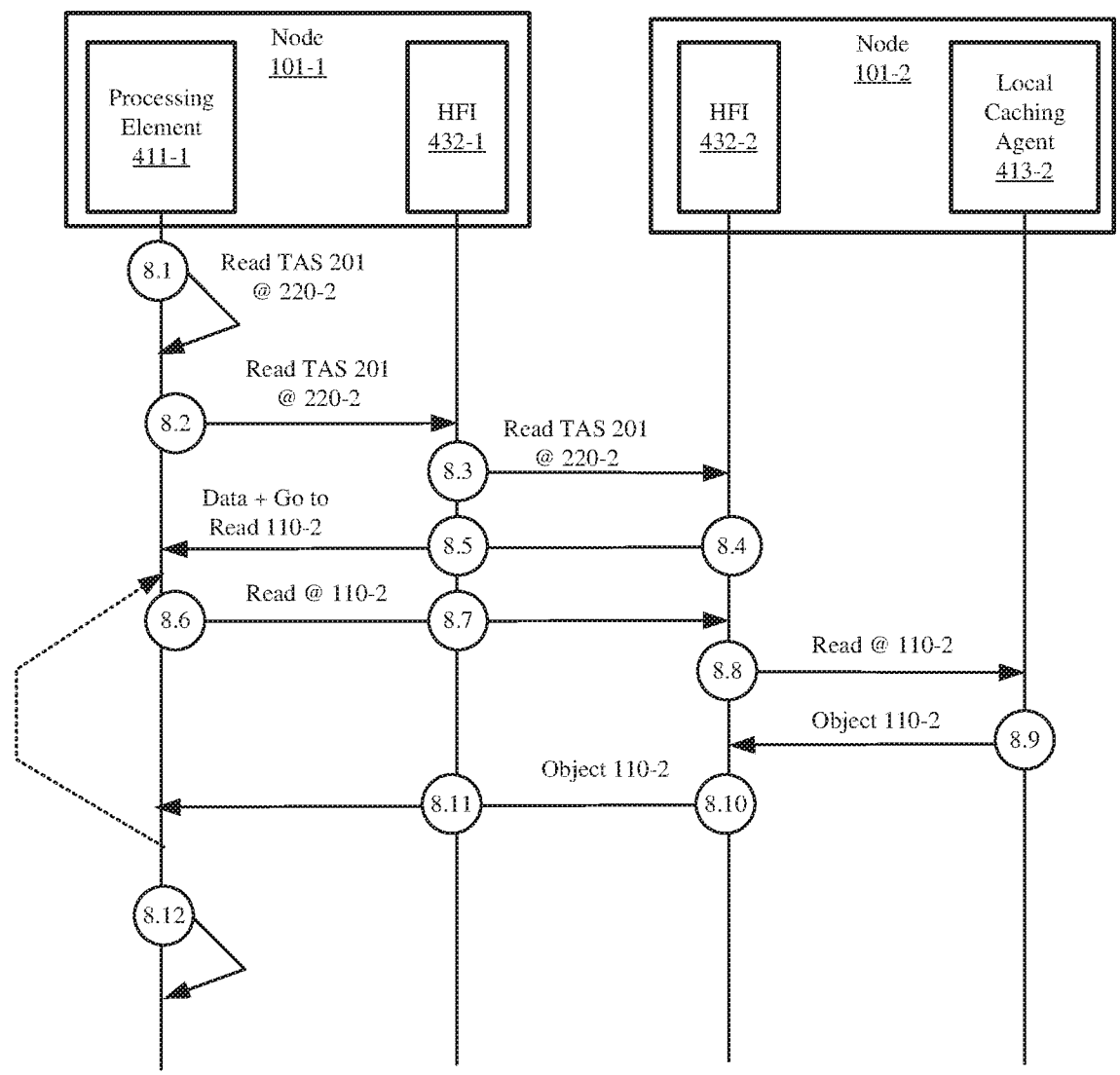
FIG. 8 illustrates a third example technique.

In particular, FIG. 8 depicts a technique 800 in which processing element 411-1 of node 101-1 accesses object 110-2 for read-only purposes. It is noted, that object 110-2 is managed by node 101-2 for this example, thus illustrating and describing a multi-node cache-coherency system with object granularity. Although this technique is described with reference to the nodes 101-1 and 101-2 depicted in FIG. 7, the technique could be implemented to access objects in any DSM system, and particularly, to provide cache-coherence at the object level in a DSM system where multiple nodes manage the DSM memory. Furthermore, it is worthy to note, that technique 800 is described in the context of not having a conflict between ownership requests. However, FIG. 9 depicts a technique including an example conflict between ownership requests.

Turning more specifically to FIG. 8 and the technique 800. The techniques 800 can begin at circle 8.1. At circle 8.1, processing element 411-1 issues a read request for object 110-2 (e.g., Read TAS 201 @220-2). More specifically, an element (e.g., thread, application, or the like) executing on processing element 411-1 issues a read request for the object in cache line 220-2 of TAS 201 (e.g., object 110-1).

Continuing to circle 8.2, the processing element 411-1 issues the read request (e.g., Read TAS 201 @220-1) to the HFI 430-1, and particularly to the HFI caching agent 432-1.

Continuing to circle 8.3, the HFI caching agent 432-1 accesses determines whether object 110-2 is managed by itself or by another HFI caching agent. For example, the HFI caching agent 432-1 can determine the cache line of interest (e.g., cache line 220-2) of the TAS 201 is managed by a remote HFI and forward the read request to the remote HFI. In this example, at circle 8.3, the HFI caching agent 432-1 determines that node 101-2 and particularly HFI caching agent 432-2 managed the cache line 220-2 and forwards the request to the remote HFI caching agent 432-2.

Continuing to block 8.4, the remote HFI caching agent 432-2 determines available access to the object referenced by cache line 220-2 and sends a control signal including an indication to access object 110-2 to the local HFI caching agent 432-1. The control signal is received by the local HFI caching agent 432-1 and sent to the processing element 432-1. In some examples, HFI caching agent 432 can also return "fake data," similar to how caching agents (e.g., local agent, home agent, or the like) in memory controllers do. In some examples, the HFI caching agent 432 can issue an interrupt (e.g., to the application stack executing on the processing element, or the like) if the command received at circle 8.3 is not supported.

In some examples, the processing element 411-1, and particularly, the thread executing on the processing element 411-1 can stall until a response (e.g., at circle 8.5, or the like) is received from the HFI caching agent 432-1 to ensure coherency for the object 110-2.

Continuing to circles 8.6, 8.7, 8.8, 8.9, 8.10 and 8.11, processing element 411-1 can issue read memory requests for object 110-2 and receive data or information elements including the object 110-2. At circle 8.6, processing element 411-1 (or thread executing on processing element 411-1) issues a read request for object 110-2 to HFI caching agent 432-1. At circle 8.7, HFI caching agent 432-1 forwards the read request for object 110-2 to the remote HFI caching agent 432-2. At circle 8.8, HFI caching agent 432-2 relays the read request to local caching agent 413-2. At circle 8.9, local caching agent 413-2 retrieves the object 110-2 from the DSM node 105 (e.g., over fabric 102, or the like) and sends the object to the remote HFI caching agent 432-2. At circle 8.10, the remote HFI caching agent 432-2 sends the object 110-2 to the HFI requesting HFI caching agent 432-1. At circle 8.11, the requesting HFI caching agent 432-1 relays the object 110-2 to the processing element 411-1.

It is noted, that circles 8.6, 8.7, 8.8, 8.9, 8.10 and 8.11 can be repeated a number of times. For example, processing element 411-1 can issue any number of read requests to the object 110-2, which can be relayed between HFI caching agents 432-1 and 432-2 as described.

Continuing to block 8.12, upon completion of accessing object 110-1, processing element 411-1 can flush object 110-2 from its cache(s). For example, processing element 411-1 can issue a command to flush object 110-2 from its cache. Furthermore, processing element 411-1 can invalidate cache line 220-2 of TAS 201 from its cache. Upon such invalidation, any acquired lock to the cache line can be released by the HFI caching agents, specifically, the HFI caching agent 432-2.

As noted, techniques 500, 600 and 800 illustrate examples without conflicts between objects 110 and processing elements 411 attempting to access the objects. However, in practice, several processing elements (or threads executing on a processing element or elements) may try to access an object simultaneously. FIG. 9 depicts an example technique 900, in which access to an object is conflicted with a prior, on-going, access. This technique is described with reference to the node 101 depicted in FIG. 4. However, it is noted, the techniques could be implemented to access objects in any DSM system, and particularly, to provide cache-coherence at the object level in a DSM system. In general, this figure depicts processing element 411-1 accessing object 110-1 for exclusive (e.g., read/write) purposes while processing element 411-2 accesses the same object 110-1 for read (or read/write) purposes, which access conflicts with the initial access by processing element 411-1.

The technique 900 can begin at circle 9.1. At circle 9.1, processing element 411-1 issues a read/write request for object 110-1 (e.g., Read/Write TAS 201 @220-1). More specifically, an element (e.g., thread, application, or the like) executing on processing element 411-1 issues a read/write request for the object in cache line 220-1 of TAS 201 (e.g., object 110-1).

Continuing to circle 9.2, the processing element 411-1 issues the read/write request (e.g., Read/Write TAS 201 @220-1) to the HFI 430, and particularly to the HFI caching agent 432.

Continuing to circle 9.3, the HFI caching agent 432 accesses the TAS 201, determines whether object 110-1 is available to access as requested and sends a control signal including an indication to access object 110-1. In some examples, HFI caching agent 432 can also return "fake data," similar to how caching agents (e.g., local agent, home agent, or the like) in memory controllers do. In some examples, the HFI caching agent 432 can issue an interrupt (e.g., to the application stack executing on the processing element, or the like) if the command received at circle 6.2 is not supported.

In some examples, the processing element 411-1, and particularly, the thread executing on the processing element 411-1 can stall until a response (e.g., at circle 9.3, or the like) is received from the HFI caching agent 432 to ensure coherency for the object 110-1.

Continuing to circles 9.4, 9.5, 9.6 and 9.7, processing element 411-1 can issue read or write memory requests for object 110-1 and receive data or information elements including the object 110-1 and or indications of confirmation of write. It is noted, an example write request is depicted in this figure. However, read requests (e.g., refer to FIG. 5) could also be issued. At circle 9.4, processing element 411-1 (or thread executing on processing element 411-1) issues a write request for object 110-1 to HFI caching agent 432. In particular, processing element 411-1 can issue a command to write over or change a portion of object 110-1 (e.g., with object 110-1 NEW, or the like). At circle 9.5, HFI caching agent 432 relays the write request to local caching agent 413. At circle 9.6, local caching agent 413 writes object 110-1 NEW to the DSM node 105 (e.g., over fabric 102, or the like) and sends an indication of confirmation of the write, or the newly written object 110-1 (e.g., object 110-1 NEW) to the HFI caching agent 432. At circle 9.7, the HFI caching agent 432 relays the indication of write conformation or the object 110-1 NEW to the processing element 411-1.

It is noted, that circles 9.4, 9.5, 9.6 and 9.7 can be repeated a number of times. For example, processing element 411-1 can issue any number of read and/or write requests to the object 110-1.

Continuing to block 9.8, processing element 411-2 issues a read request for object 110-1 (e.g., Read TAS 201 @220-1). More specifically, an element (e.g., thread, application, or the like) executing on processing element 411-2 issues a read request for the object in cache line 220-1 of TAS 201 (e.g., object 110-1). It is noted, that circle 9.8 could be implemented at any time while processing element 411-1 has read/write access to cache line 220-1 and object 110-1.

Continuing to circle 9.9, the HFI coherency agent 432 sends a snoop command (e.g., based on MESI, MOESI or the like coherency protocol). In some examples, the HFI coherency agent 432 can indicate (e.g., in a model specific register for processing element 411-1, or the like) that the cache line 220-1 (and this objet 110-1) has been snooped and an interrupt or indication of such snoop provided to a software stack or to an application stack. As such, the processing elements 411-1 and 411-2, and particularly threads executing on the processing elements can resolve the conflict (e.g., processing element 411-2 can terminate its request to access cache line 220-1, processing element 411-1 can terminate its access to cache line 220-1 to free the cache line, or the like)

Figure 10:
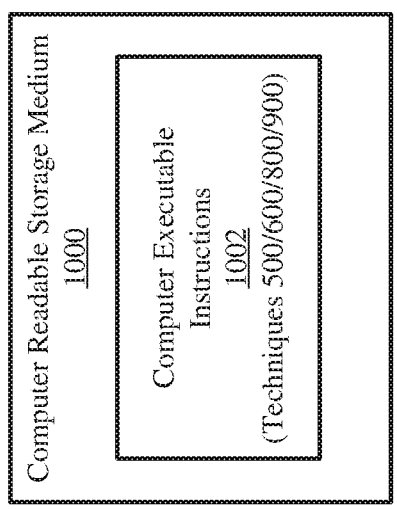
FIG. 10 illustrates an example of a storage medium.

FIG. 10 illustrates an example storage medium 1000. As shown in FIG. 10, the storage medium includes a storage medium 1000. The storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions 1002, such as instructions to implement techniques, or portions of techniques 500, 600, 800 or 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
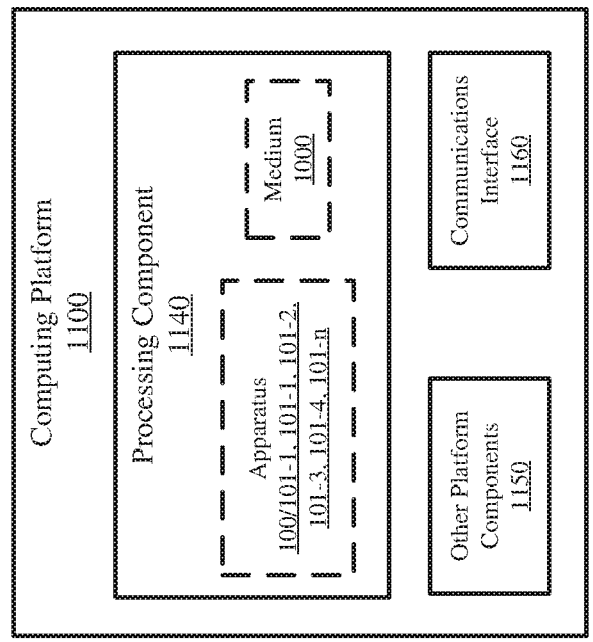
FIG. 11 illustrates an example computing platform.

FIG. 11 illustrates an example computing platform 1100. In some examples, as shown in FIG. 11, computing platform 1100 may include a processing component 1140, other platform components 1150 or a communications interface 1160. According to some examples, computing platform 1100 may be a node of a DSM system configured to provide cache coherency at the object level, such as nodes 101-1, 101-2, 101-3, 101-4, 101-*n* of system 100 of FIG. 1. Computing platform 1100 may either be a single physical server or a composed logical server that includes combinations of disaggregate components or elements composed from a shared pool of configurable computing resources.

According to some examples, processing component 1140 may execute processing operations or logic for apparatus 100, 101, 101-1, 101-2, 101-3, 101-4 or 101-*n* and/or storage medium 1000. Processing component 1140 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1150 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1160 may include logic and/or features to support a communication interface. For these examples, communications interface 1160 may include one or more communication interfaces that operate according to various communication protocols or standards to communicate over direct or network communication links Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification. Network communications may also occur according to the Infiniband Architecture specification or the TCP/IP protocol.

As mentioned above computing platform 1100 may be implemented in a single server or a logical server made up of composed disaggregate components or elements for a shared pool of configurable computing resources. Accordingly, functions and/or specific configurations of computing platform 1100 described herein, may be included or omitted in various embodiments of computing platform 1100, as suitably desired for a physical or logical server.

The components and features of computing platform 1100 may be implemented using any combination of discrete circuitry, application specific integrated circuits (ASICs), logic gates and/or single chip architectures. Further, the features of computing platform 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1. An apparatus for a node in a fabric of nodes, the apparatus comprising: a host fabric interface (HFI) to: receive an access request, the access request to include an indication of a thread to access an object stored on a distributed shared memory (DSM) node coupled to the HFI; determine whether access of the object is allowed based on a tracking address space (TAS), the TAS comprising indications of one or more objects and an indication of an ownership status for each of the one or more objects; and relay the access request to the DSM node based on a determination that access of the object is allowed.

Example 2. The apparatus of example 1, the HFI to receive an access request response including an information element from the DSM node, the information element to include an indication of at least a portion of the object.

Example 3. The apparatus of example 1, the access request to include an indication to exclusively access the object, the HFI to: determine whether exclusive access of the object is allowed based on the TAS; and relay the access request to the DSM node based on a determination that exclusive access of the object is allowed.

Example 4. The apparatus of example 3, the access request to include an information element including an indication of a portion of the object and a request to store the portion of the object on the DSM.

Example 5. The apparatus of example 1, the TAS comprising one or more cachelines, each of the one or more cachelines to include an indication of an object stored on the DSM node and an ownership status of the object.

Example 6. The apparatus of example 5, the HFI to: receive a request to invalidate a cacheline of the one or more cachelines; and invalidate the cacheline.

Example 7. The apparatus of example 5, the ownership status to include an indication of a thread executing on a processing element coupled to the HFI and an indication of a level of access of the thread.

Example 8. The apparatus of example 7, the level of access comprising a read access or a read and write access.

Example 9. The apparatus of example 1, the HFI to send a snoop command to an application queue based on a determination that access of the object is not allowed, the snoop command to include an indication that access of the object was requested.

Example 10. The apparatus of example 1, comprising a memory coupled to the HFI to store the TAS.

Example 11. A system comprising: a processor to execute a plurality of threads; a memory to store a tracking address space (TAS), the TAS comprising indications of one or more objects and an indication of an ownership status of each of the one or more objects; and a host fabric interface (HFI), the HFI to: receive an access request from the processor, the access request to include an indication of a one of the plurality of threads to access an object of the one or more objects, the object of the one or more objects stored on a distributed shared memory (DSM) node coupled to the HFI; determine whether access of the object is allowed based on the TAS; and relay the access request to the DSM node based on a determination that access of the object is allowed.

Example 12. The system of example 11, the HFI to receive an access request response from the DSM node, the access request response to include an information element including an indication of at least a portion of the object.

Example 13. The system of example 11, the access request to include an indication to exclusively access the object, the HFI to: determine whether exclusive access of the object is allowed based on the TAS; and relay the access request to the DSM node based on a determination that exclusive access of the object is allowed.

Example 14. The system of example 13, the access request to include an information element including an indication of a portion of the object and a request to store the portion of the object on the DSM.

Example 15. The system of example 13, the TAS comprising one or more cachelines, each of the one or more cachelines to include an indication of an object stored on the DSM node and an ownership status of the object.

Example 16. The system of example 15, the HFI to: receive a request from the processor to invalidate a cacheline of the one or more cachelines; and invalidate the cacheline.

Example 17. The system of example 15, the ownership status to include an indication of a thread executing on the processing element and an indication of an access level of the thread to the object.

Example 18. The system of example 17, the access level comprising a read access or a read and write access.

Example 19. The system of example 11, the HFI to send a snoop command to an application queue based on a determination that access of the object is not allowed, the snoop command to include an indication that access of the object was requested.

Example 20. The system of example 11, the HFI an HFI of a node of a plurality of nodes of a datacenter.

Example 21. A method comprising: receiving, at a host fabric interface (HFI), an access request to include an indication of a thread to access an object stored on a distributed shared memory (DSM) node coupled to the HFI; determining whether access of the object is allowed based on a tracking address space (TAS), the TAS comprising indications of one or more objects and an indication of an ownership status for each of the one or more objects; and relaying the access request to the DSM node based on a determination that access of the object is allowed.

Example 22. The method of example 21, comprising receiving, at the HFI, an access request response including an information element from the DSM node, the information element to include an indication of at least a portion of the object.

Example 23. The method of example 21, the access request to include an indication to exclusively access the object, the method comprising: determining whether exclusive access of the object is allowed based on the TAS; and relaying the access request to the DSM node based on a determination that exclusive access of the object is allowed.

Example 24. The method of example 23, the access request to include an information element including an indication of a portion of the object and a request to store the portion of the object on the DSM.

Example 25. The method of example 21, the TAS comprising one or more cachelines, each of the one or more cachelines to include an indication of an object stored on the DSM node and an ownership status of the object.

Example 26. The method of example 25, the method comprising: receiving a request to invalidate a cacheline of the one or more cachelines; and invalidating the cacheline.

Example 27. The method of example 25, the ownership status to include an indication of a thread executing on a processing element coupled to the HFI and an indication of a level of access of the thread.

Example 28. The method of example 27, the level of access comprising a read access or a read and write access.

Example 29. The method of example 21, comprising sending a snoop command to an application queue based on a determination that access of the object is not allowed, the snoop command to include an indication that access of the object was requested.

Example 30. An apparatus comprising means for performing the methods of any one of examples 21 to 29.

Example 31. At least one machine readable medium comprising a plurality of instructions that in response to being executed by a host fabric interface (HFI) cause the HFI to: receive an access request to include an indication of a thread to access an object stored on a distributed shared memory (DSM) node coupled to the HFI; determine whether access of the object is allowed based on a tracking address space (TAS), the TAS comprising indications of one or more objects and an indication of an ownership status for each of the one or more objects; and relay the access request to the DSM node based on a determination that access of the object is allowed.

Example 32. The at least one machine readable medium of example 31, the instructions to further cause the HFI to receive an access request response including an information element from the DSM node, the information element to include an indication of at least a portion of the object.

Example 33. The at least one machine readable medium of example 31, the access request to include an indication to exclusively access the object, the instructions to further cause the HFI to: determine whether exclusive access of the object is allowed based on the TAS; and relay the access request to the DSM node based on a determination that exclusive access of the object is allowed.

Example 34. The at least one machine readable medium of example 33, the access request to include an information element including an indication of a portion of the object and a request to store the portion of the object on the DSM.

Example 35. The at least one machine readable medium of example 31, the TAS comprising one or more cachelines, each of the one or more cachelines to include an indication of an object stored on the DSM node and an ownership status of the object.

Example 36. The at least one machine readable medium of example 35, the instructions to further cause the HFI to: receive a request to invalidate a cacheline of the one or more cachelines; and invalidate the cacheline.

Example 37. The at least one machine readable medium of example 35, the ownership status to include an indication of a thread executing on a processing element coupled to the HFI and an indication of a level of access of the thread.

Example 38. The at least one machine readable medium of example 37, the level of access comprising a read access or a read and write access.

Example 39. The at least one machine readable medium of example 31, the instructions to further cause the HFI to send a snoop command to an application queue based on a determination that access of the object is not allowed, the snoop command to include an indication that access of the object was requested.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a host fabric interface (HFI) to:
receive an access request, the access request to include an indication of a thread to access an object stored on a distributed shared memory (DSM) node coupled to the HFI;
determine whether access of the object is allowed based on a tracking address space (TAS), the TAS comprising indications of one or more objects stored on the DSM node; and
relay the access request to the DSM node based on a determination that access of the object is allowed.

2. The apparatus of claim 1, the HFI to receive an access request response including an information element from the DSM node, the information element to include an indication of at least a portion of the object.

3. The apparatus of claim 1, the access request to include an indication to exclusively access the object, the HFI to:
determine whether exclusive access of the object is allowed based on the TAS; and
relay the access request to the DSM node based on a determination that exclusive access of the object is allowed.

4. The apparatus of claim 3, the access request to include an information element including an indication of a portion of the object and a request to store the portion of the object on the DSM.

5. The apparatus of claim 1, the TAS comprising one or more cachelines, each of the one or more cachelines to include an indication of an object stored on the DSM node and an ownership status of the object.

6. The apparatus of claim 5, the HFI to:
receive a request to invalidate a cacheline of the one or more cachelines; and
invalidate the cacheline.

7. The apparatus of claim 5, the ownership status to include an indication of a thread executing on a processing element coupled to the HFI and an indication of a level of access of the thread.

8. The apparatus of claim 7, the level of access comprising a read access or a read and write access.

9. The apparatus of claim 1, the HFI to send a snoop command to an application queue based on a determination that access of the object is not allowed, the snoop command to include an indication that access of the object was requested.

10. A system comprising:
a processor to execute a plurality of threads;
a memory to store a tracking address space (TAS), the TAS comprising indications of one or more objects; and
a host fabric interface (HFI), the HFI to:
receive an access request from the processor, the access request to include an indication of a one of the plurality of threads to access an object of the one or more objects, the object of the one or more objects stored on a distributed shared memory (DSM) node coupled to the HFI;
determine whether access of the object is allowed based on the TAS; and
relay the access request to the DSM node based on a determination that access of the object is allowed.

11. The system of claim 10, the HFI to receive an access request response from the DSM node, the access request response to include an information element including an indication of at least a portion of the object.

12. The system of claim 10, the access request to include an indication to exclusively access the object, the HFI to:
determine whether exclusive access of the object is allowed based on the TAS; and
relay the access request to the DSM node based on a determination that exclusive access of the object is allowed.

13. The system of claim 12, the access request to include an information element including an indication of a portion of the object and a request to store the portion of the object on the DSM.

14. The system of claim 12, the TAS comprising one or more cachelines, each of the one or more cachelines to include an indication of an object stored on the DSM node and an ownership status of the object.

15. The system of claim 10, the HFI to send a snoop command to an application queue based on a determination that access of the object is not allowed, the snoop command to include an indication that access of the object was requested.

16. The system of claim 10, the HFI an HFI of a node of a plurality of nodes of a datacenter.

17. A method comprising:
receiving, at a host fabric interface (HFI), an access request to include an indication of a thread to access an object stored on a distributed shared memory (DSM) node coupled to the HFI;
determining whether access of the object is allowed based on a tracking address space (TAS), the TAS comprising indications of one or more objects stored on the DSM node; and
relaying the access request to the DSM node based on a determination that access of the object is allowed.

18. The method of claim 17, comprising receiving, at the HFI, an access request response including an information element from the DSM node, the information element to include an indication of at least a portion of the object.

19. The method of claim 17, the access request to include an indication to exclusively access the object, the method comprising:
determining whether exclusive access of the object is allowed based on the TAS; and
relaying the access request to the DSM node based on a determination that exclusive access of the object is allowed.

20. The method of claim 17, the TAS comprising one or more cachelines, each of the one or more cachelines to include an indication of an object stored on the DSM node and an ownership status of the object.

21. The method of claim 20, the method comprising:
receiving a request to invalidate a cacheline of the one or more cachelines; and
invalidating the cacheline.

22. At least one machine readable medium comprising a plurality of instructions that in response to being executed by a host fabric interface (HFI) cause the HFI to:
receive an access request to include an indication of a thread to access an object stored on a distributed shared memory (DSM) node coupled to the HFI;
determine whether access of the object is allowed based on a tracking address space (TAS), the TAS comprising indications of one or more objects stored on the DSM node; and relay the access request to the DSM node based on a determination that access of the object is allowed.

23. The at least one machine readable medium of claim 22, the instructions to further cause the HFI to receive an access request response including an information element from the DSM node, the information element to include an indication of at least a portion of the object.

24. The at least one machine readable medium of claim 22, the access request to include an indication to exclusively access the object, the instructions to further cause the HFI to:
  determine whether exclusive access of the object is allowed based on the TAS; and
  relay the access request to the DSM node based on a determination that exclusive access of the object is allowed.

25. The apparatus of claim 1, the HFI to receive the access request via a network fabric.

* * * * *